Oct. 23, 1951  W. L. CHURCH  2,572,318
PIPE HOLDING SLIP

Filed Aug. 14, 1945  2 SHEETS—SHEET 1

Inventor
Walter L. Church
By E. J. Hardway,
Attorney

Oct. 23, 1951 W. L. CHURCH 2,572,318
PIPE HOLDING SLIP
Filed Aug. 14, 1945 2 SHEETS—SHEET 2

Inventor
Walter L. Church

By
E. V. Hardway
Attorney

UNITED STATES PATENT OFFICE 2,572,318

PIPE HOLDING SLIP

Walter L. Church, Houston, Tex.

Application August 14, 1945, Serial No. 610,764

4 Claims. (Cl. 24—263)

This invention relates to pipe holding slips.

An object of the invention is to provide equipment of the character described for holding a string of pipe suspended in a well.

Another object is to provide pipe holding slips particularly designed for holding pipe while a string of pipe is being made up and lowered into a well or broken up and withdrawn from the well.

A particular feature of the invention resides in novel means for handling the slip segments whereby they may be readily applied to the pipe by gravity or released from the pipe and withdrawn by pressure fluid actuated means.

A still further object resides in the provision of auxiliary mechanical means for holding the slip segments away from the pipe when they are in withdrawn position.

Other objects and advantages will be apparent from the following specification which is illustrated by the accompanying drawings, wherein.

Figure 1:
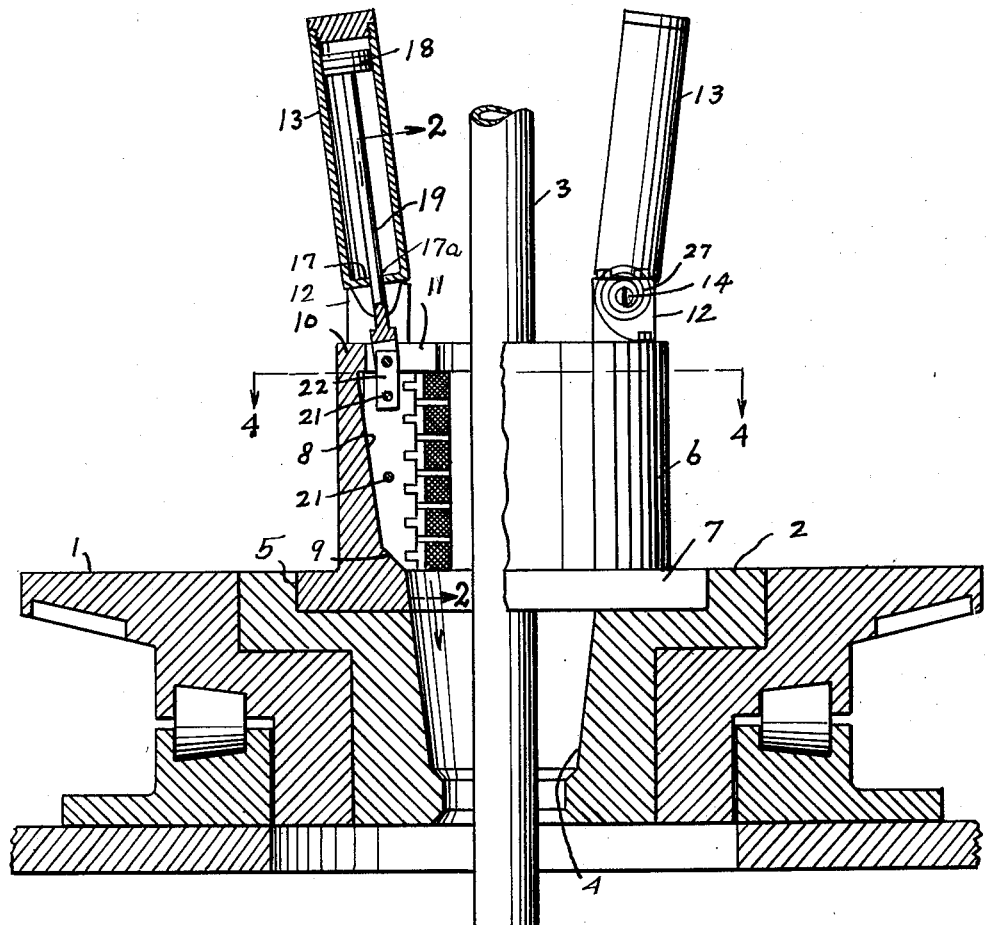
Figure 1 is a side view, partly in section, of the slips with the manifold and its coupling removed for the sake of clearness.
Figure 2:
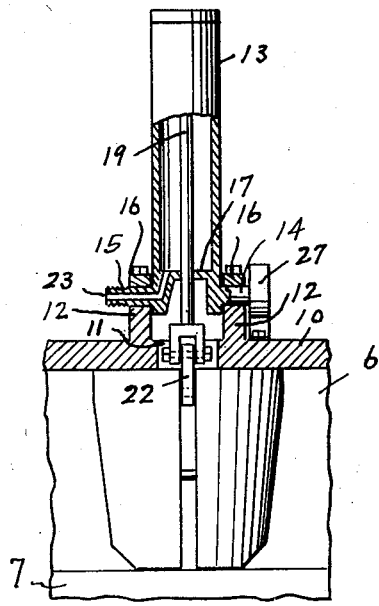
Figure 2 is a fragmentary, vertical, sectional view taken on the line 2—2 of Figure 1.
Figure 3:
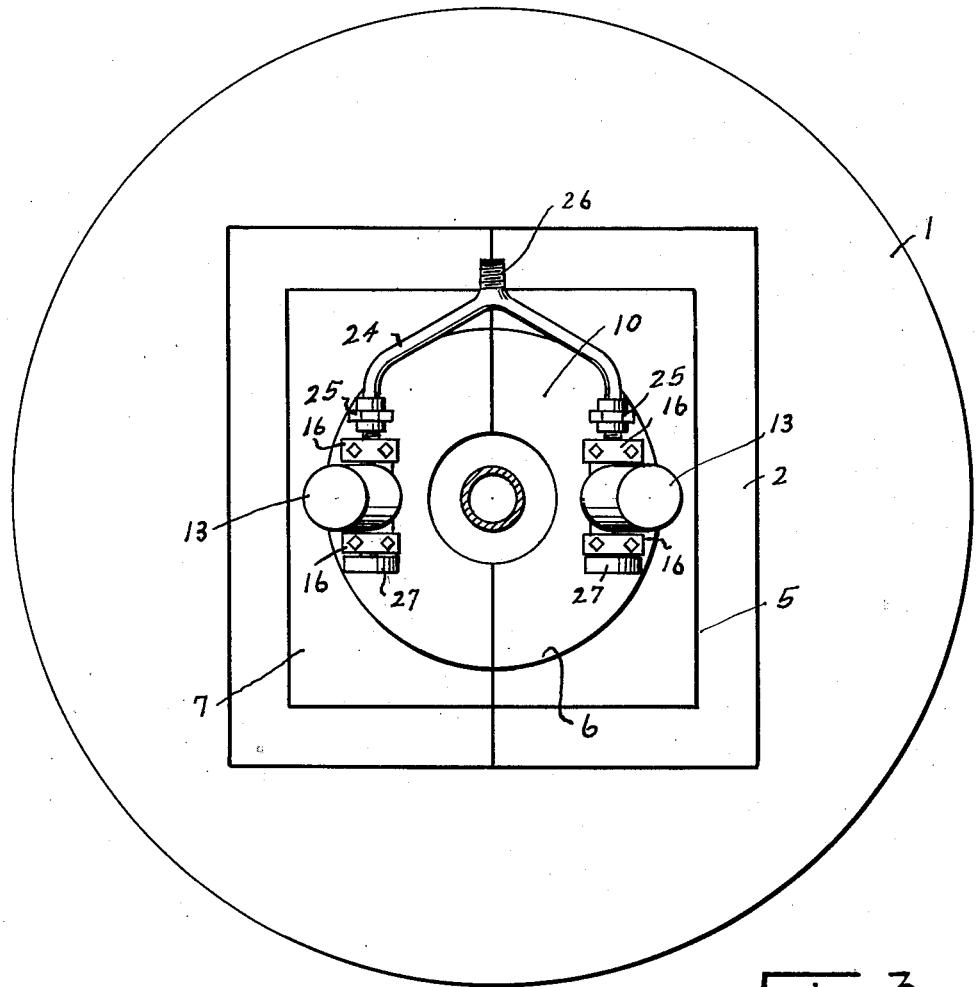
Figure 3 is a plan view.
Figure 4:
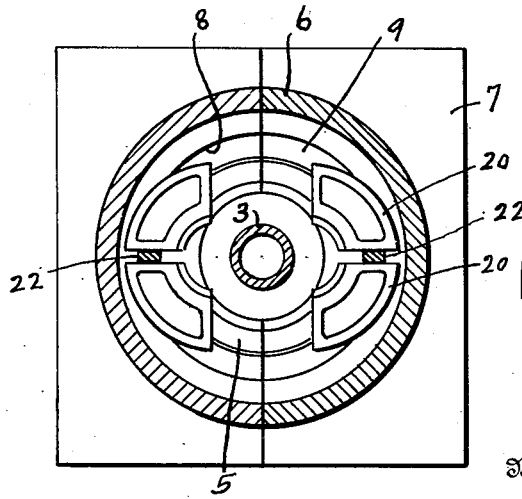
Figure 4 is a horizontal sectional view taken on the line 4—4 of Figure 1.

Referring more particularly to the drawings the numeral 1 designates a rotary table in which a square drive bushing 2 is seated. This bushing has a central vertical opening for the passage of the string of pipe 3, said opening being formed with the downwardly tapering slip seat 4.

The bushing 2 is formed of section for convenience in handling and has a rectangular countersunk seat 5 in its top.

The numeral 6 designates a slip bowl whose lower end is formed with an external, rectangular, flange 7 shaped to fit into the seat 5. The bowl is formed of sections, preferably two, for convenience in handling. The bowl is of general tubular shape and has an inside, downwardly tapering, slip seat 8, terminating at its lower end in the inside, annular, downwardly converging shoulder 9. The bowl also has an inside annular flange 10 at its upper end which has opposing radial slots, as 11.

On opposite sides of the slots 11, and upstanding from the flange 10, and preferably formed integrally therewith, there are the pairs of lugs, 12, 12.

There are the opposing cylinders 13, 13 which are provided with the lateral trunnions 14, 15. These trunnions are maintained in bearings in the corresponding lugs 12 by the bearings caps 16.

The outer ends of the cylinders are closed and their inner ends are formed with transverse webs 17. In the cylinders are pistons, as 18, which are connected to the outer ends of piston rods, as 19. The lower ends of these rods work through central bearings 17a in the webs 17.

In the bowl 6 there are the slip sections, preferably two, and each section is formed of two segments 20, 20 which are loosely connected together by upper and lower cross pins 21. The outer sides of the segments are transversely curved and downwardly tapered to conform to the contour of, and to fit in, either of the seats 4 or 8, and their inner sides are transversely curved and toothed to fit around, and grip, the pipe 3.

Links 22, 22 are pivoted, at their lower ends, on the upper cross pins 21 of the respective slip sections, and the lower ends of the piston rods 19 are pivotally connected to the upper ends of said links.

The trunnions 15 have the axial bores 23 which lead into the respective cylinders above the webs 17.

There is a manifold 24 which has branches connected to the trunnions by the unions 25. This manifold also has a connection 26 for the connection of a pressure line thereto.

In operation the pressure fluid, such as steam or compressed air, may be relieved from the cylinders 13, by a conventional relief valve provided for the purpose and the slips will fall by gravity from the seat 8 into the seat 4 and into gripping relation with the string of pipe 3 to support the same. If it should be desired to now rotate the pipe the pressure line may be disconnected from the connection 26 and the rotary table turned, in the usual manner, to rotate the pipe.

The pipe will be handled, while the string is being made up in going into the well, or broken up, while being withdrawn, by the usual type of elevators connected to a travelling block which is suspended from the crown block of the derrick by a cable in the usual way and this cable is operated by the drawworks on the derrick floor and forming part of the drilling rig. When it is desired to release the slip segments from the string 3 in order that the latter may be elevated or lowered fluid under pressure is applied to the cylinders 13 to elevate the pistons 18 and the slip sections will be correspondingly elevated from the seat 4 up into the slip bowl and will be moved radially outwardly into the seat 8 by means of the coil springs 27, 27. Each spring 27 is attached, at its inner end, to the corresponding trunnion 14 and at its outer end to the top flange 10 of the bowl 6. The tension of these springs tends to cause the cylinders 13 to pivot outwardly, as shown in Figure 1, so as to swing the slip sections outwardly into the seat 8 and out of the way of the string of pipe 3.

When the slips are not in use one, or both, of the unions 25 may be disconnected and the sections of the slip bowl 6 together with the corresponding cylinders and slip sections may be removed and laid aside until again needed.

The drawings and description are illustrative merely while the broad principle of the invention will be defined by the appended claims.

What I claim is:

1. A pipe holding slip assembly comprising, a member having an inside downwardly tapering lower slip seat, a slip bowl on said member having an inside downwardly tapering slip seat, upper slip sections arranged in the assembly to surround a pipe through the seats, releasable fluid pressure operable means pivotally mounted on the bowl and connected to the slip sections and operable to lift the sections from the lower seat to the upper seat, said lifting means being releasable to allow the slip sections to move by gravity from the upper seat onto the lower seat.

2. A pipe holding slip assembly comprising, a member having an inside downwardly tapering lower slip seat, a slip bowl on said member having an inside downwardly tapering upper slip seat, slip sections in the assembly arranged around a pipe through the seats, releasable fluid pressure operable means pivoted on, and upstanding from, the bowl and connected to the slip sections and operable to lift the sections from the lower seat to the upper seat, yieldable means normally tending to hold the slip sections, when in the upper seat, radially outwardly away from the pipe, said lifting means being releasable to allow the slip sections to move by gravity from the upper seat onto the lower seat and in engagement with the pipe.

3. Pipe holding slips comprising, a slip bowl having an inside slip seat, slip sections associated with the bowl, upstanding cylinders pivotally mounted on the slip bowl, pistons in the cylinders and connected to the slip sections, means for introducing fluid under pressure into the cylinders on one side of the pistons to elevate the pistons and align the slip sections with said seat and means for relieving said pressure to allow the slip sections to move beneath said seat, by gravity, upon relief of said pressure, and yieldable means normally tending to hold the slips sections, when in said seat, radially outwardly away from the pipe.

4. Pipe holding slips forming a unitary structure and comprising, a slip bowl having an inside downwardly tapering slip seat, slip sections associated with the bowl, upstanding cylinders whose lower ends are pivotally mounted on the slip bowl to move radially with respect to said bowl, pistons in the cylinders and connected to the slip sections, means for introducing fluid under pressure into the cylinders, on one side of the pistons, to elevate the pistons and slip sections connected therewith to move said slip sections opposite the seat, and means for releasing said pressure to allow the slip sections to move beneath the seat by gravity upon relief of said pressure and yieldable means normally tending to hold the slip sections, when elevated, seated in said seat radially outwardly away from the pipe.

WALTER L. CHURCH.

REFERENCES CITED

The following references are of record in the file of this patent:

UNITED STATES PATENTS

| Number | Name | Date |
| --- | --- | --- |
| 1,341,702 | Black | June 1, 1920 |
| 2,012,329 | Wickersham et al. | Aug. 27, 1935 |
| 2,109,546 | McLagan | Mar. 1, 1938 |
| 2,231,923 | Koen | Feb. 18, 1941 |
| 2,340,597 | Kelley | Feb. 1, 1944 |